(12) United States Patent
Klotz (10) Patent No.: US 7,275,902 B1
(45) Date of Patent: Oct. 2, 2007

(54) GAS CYLINDER DELIVERY SYSTEM

(75) Inventor: Maynard F. Klotz, Naperville, IL (US)

(73) Assignee: Welding Company of America, Aurora, IL (US)

( * ) Notice: Subject to any disclaimer, the term of this patent is extended or adjusted under 35 U.S.C. 154(b) by 259 days.

(21) Appl. No.: 11/111,332

(22) Filed: Apr. 21, 2005

Related U.S. Application Data (60) Provisional application No. 60/566,357, filed on Apr. 29, 2004.

(51) Int. Cl.
*B60P 7/08* (2006.01)

(52) U.S. Cl. .............................. 410/42; 410/32; 410/46

(58) Field of Classification Search .................. 410/32, 410/35–36, 42, 46–47; 224/403–404; 206/446; 296/182.1, 204, 183.1, 184.1, 186.2, 37.6, 296/186.5, 190.03

See application file for complete search history.

(56) References Cited

U.S. PATENT DOCUMENTS

| | | | |
|---|---|---|---|
| 1,854,711 A | 4/1932 | Mayer | |
| 3,451,573 A | 6/1969 | Josephian | |
| 3,498,481 A | 3/1970 | Size | |
| 3,602,368 A | 8/1971 | Gould | |
| 3,631,974 A | 1/1972 | Schaefer | |
| 3,934,926 A | 1/1976 | Bennett | |
| 3,993,343 A | 11/1976 | Bennett | |
| 3,993,344 A | 11/1976 | Bennett | |
| 4,005,788 A | 2/1977 | Ratliff | |
| 4,078,676 A | 3/1978 | Mortenson | |
| 4,295,431 A | 10/1981 | Stavlo | |
| 4,481,972 A | 11/1984 | Stavlo | |
| 4,542,774 A | 9/1985 | Stavlo | |
| 4,564,109 A | 1/1986 | Stavlo | |
| 4,583,777 A | 4/1986 | Myburgh | |
| 4,642,007 A | 2/1987 | Marshall et al. | |
| 4,930,969 A | 6/1990 | Langer | |
| 5,007,672 A | 4/1991 | Koch | |
| 5,078,415 A | 1/1992 | Goral | |
| 5,152,575 A | 10/1992 | DeMonte et al. | |
| 5,154,556 A | 10/1992 | Wappel | |
| 5,267,648 A | 12/1993 | Baker | |
| 5,378,106 A | 1/1995 | Risley et al. | |
| 5,618,138 A * | 4/1997 | Lockhart ..................... | 410/69 |
| 6,017,082 A | 1/2000 | Leoni | |
| 6,070,422 A | 6/2000 | Alvenes | |
| 6,224,024 B1 | 5/2001 | Fritz | |
| 6,405,882 B1 | 6/2002 | Baxter | |
| 6,494,549 B2 | 12/2002 | Van Daalwyk | |
| 6,685,404 B2 | 2/2004 | Udivich et al. | |

* cited by examiner

*Primary Examiner*—Stephen Gordon
(74) *Attorney, Agent, or Firm*—Seyfarth Shaw LLP (57) ABSTRACT

A truck body for a transport of compressed gas cylinders on pallets carries a lift gate in the rear, and a front fence that is attachable and detachable so that fences of various heights of types may be utilized. Also, the truck body may have open bottom bays for receiving pallets, but the bays may carry expanded metal sheets for safety purposes. Also, a removable curtain/roof accessory assembly of light weight may be used to enclose the truck bed. A lift gate with novel attachment is also provided.

8 Claims, 12 Drawing Sheets

GAS CYLINDER DELIVERY SYSTEM

Priority is claimed from provisional application Ser. No. 60/566,357, filed Apr. 29, 2004.

BACKGROUND OF THE INVENTION

Compressed gas cylinders are bulky and heavy, and despite the use of heavy steel in the cylinders, they are surprisingly fragile. If the dispensing valve on the gas cylinder is broken off by rough handling, the consequences can be quite dangerous.

Accordingly, large numbers of compressed gas cylinders may be transported by a special system such as is shown in U.S. Pat. No. 5,573,360, or by a commercial transport truck bed that is available from the Welding Company of America of Northlake, Ill., which may be used for safer gas cylinder transport.

Such truck beds are divided into a plurality of bays in which each bay receives a pallet, which is latched in position, while the gas cylinders present on the pallets are tightly secured by a surrounding chain or the like. Typically, a lift gate is positioned at the rear of the truck body which carries the truck bed, with the lift gate being arranged vertically when the truck is enroute, to serve as a partition that prevents articles from falling off the bed. Then, the lift gate can be pivoted into a horizontal position and lowered to receive free-standing gas cylinders or other cargo. A conventional mechanism is operated to lift the gate, to enable the material to be easily loaded onto the truck body. Then, for transport, the lift gate is rotated 90° from horizontal to vertical, to serve as a back partition that assures retention of the cargo. The pallets are loaded on the body from the sides. The pallet bottoms from the flat surface onto which free standing cylinders may be rolled between the pallets and lift gate.

In the past, various companies have attached lift gate mountings to a truck body by attachment of a mounting to a pair of tubes which are carried on each side of the rear end of the truck and to which the lift gate was attached. There has been a problem of strength issues with this particular design.

Also, typically, a fence is required at the front end of the truck body which carries the above-described truck bed. Because various customers have varying requirements for the height of the front fence, depending upon the size and nature of the gas cylinders and other factors, a number of different designs of truck bed must be manufactured, each having a front fence of differing height. Thus, manufacturers must maintain a larger inventory of the various, different designs, and the user, having only one design, may encounter difficulties if the need arises to put the system to a use where a different fence height would be more optimum.

Special truck bodies of the prior art include those without a solid bed, but instead provide a grid of longitudinally and laterally extending beams, having spaces between them. This is adequate for receiving pallets, loaded and unloaded, and results in weight reduction, reduced cost for the truck bed, and other advantages, with full or empty pallets generally always covering the open spaces in the truck bed.

However, more recently, gas cylinders on a pallet have been connected to a manifold, which is carried by the pallet, so that the gas cylinders and the pallet are all unloaded and left at the site of use. Without an empty pallet to fill it, truck bed spaces can remain open, which can create hazard. By this invention, a simple means for avoiding the danger of such open spaces is provided.

Also, by this invention a simple, inexpensive truck body is provided, which comprises a truck bed without permanent sidewalls and roof, but which, when desired, can provide enclosure to the product carried on the truck bed, without the expense which must be incurred to obtain a full, closed-in trailer with permanent sidewalls and roof, and which also permits side loading of the cargo.

DESCRIPTION OF THE INVENTION

In one aspect of the present invention, a vehicle for transport and delivery of gas cylinders is provided. The vehicle comprises: a truck having a driver cab, a truck body, and a bed for carrying the gas cylinders, which bed is connected to the driver cab and body.

In some embodiments of this invention, the bed comprises a series of horizontal, crossing, longitudinal and lateral crossbars to provide a series of open compartments, which are proportioned to receive pallets carrying compressed gas cylinders. The compartments carry horizontal, secured, apertured metal sheeting across the area of the compartments, for safety when a pallet is not present.

Specifically, the apertured metal sheeting may comprise expanded metal sheeting, which may be formed in a conventional manner by slitting metal sheeting and then pulling it to form the expanded, apertured metal sheeting. Alternatively, a preformed metal grate or the like may be used as the apertured metal sheeting.

In some embodiments, the apertured metal sheeting is carried underneath at least some of the crossbars, so that pallets carrying the gas cylinders may easily rest upon the crossbars. The expanded metal or other apertured sheeting may be welded to the crossbars, typically on the underside thereof.

Thus, pallets containing gas cylinders may be readily placed into and out of the compartments with a forklift truck or the like, while those compartments (also called bays) may be rendered safe, in that the apertured metal sheeting prevents workers from falling through the truck bed.

In another aspect of this invention, a vehicle for transport and delivery of gas cylinders comprises a truck having a driver cab, truck body, and a bed for carrying the gas cylinders, the bed being connected to the driver cab and body. By this aspect of the invention, the truck has a fence member which is positioned adjacent to a forward end of the bed and behind the driver cab. The fence member is removably secured in place, to permit customized installation of a fence member as described above, which has a desired height, or a similar customized feature.

As previously stated, different users of the vehicles described above prefer fence members of differing heights and other characteristics. By this means, the desired fence member may be easily provided.

The fence members may carry apertured retention tabs, which provide strong, bolted (or otherwise reversibly secured) connection with a forward plate connected to the truck body. The fence members may define fence rails and posts that carry expanded metal mesh between them.

As a further aspect of this invention, a vehicle for transport and delivery of product, such as gas cylinders, comprises: a truck having a driver cab and truck body, and a bed carrying the product. The truck body defines a frame that carries the bed, the frame defining a rear portion that carries a pair of triangular gusset members adjacent to rear corners of the frame. The gusset members each carry vertical, rearwardly facing mounting plates. A lift gate is welded to outer faces of the mounting plates, providing advantages of simplicity and improved strength over other designs.

Furthermore, in some embodiments, the lift gate is secured to the truck body only through the welding to the mounting plates.

As another aspect of the invention of this application, a vehicle such as a vehicle for transport and delivery of gas cylinders comprises a truck body in the bed for transport and delivery of products. The truck body carries a curtain assembly, which comprises a rectangular frame which, in turn, carries flexible, curtain-like side walls. Strap members are attached to the curtain-like side walls. The strap members have lower ends that carry bottom hooks. The bottom hooks engage portions of the truck body, such as horizontally disposed angle-iron bars, to secure the side walls.

In some embodiments, the curtain assembly comprises a roof attached to the frame. Additionally, a front curtain wall may be carried by the frame if desired.

In some embodiments, the curtain-like side walls can slide horizontally to open the vehicle and provide lateral access to the bed.

DESCRIPTION OF THE DRAWINGS

In this invention.

DESCRIPTION OF SPECIFIC EMBODIMENTS

Figure 1:
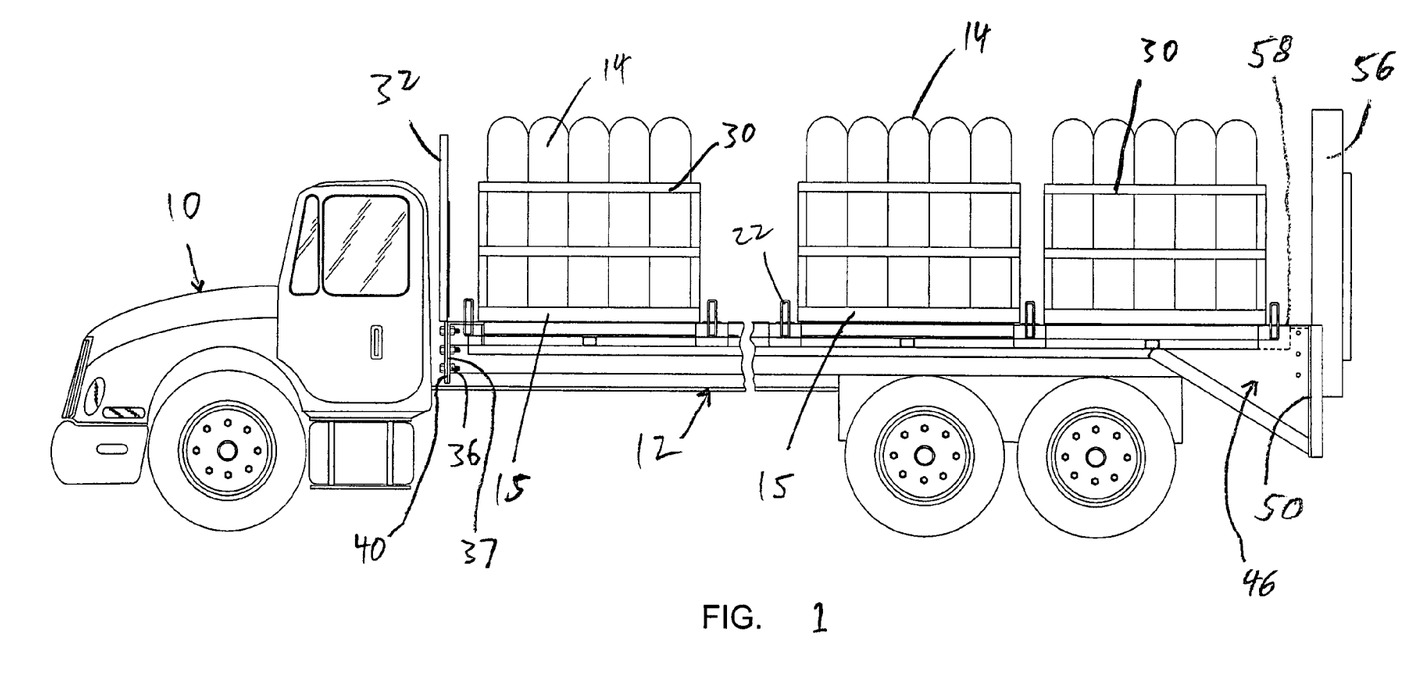
FIG. 1 is an elevational view of a truck which carries a truck bed in accordance with this invention, shown to be carrying pallets of pressurized gas cylinders.

Referring to the drawings, FIG. 1 shows a truck 10 which has a conventional, wheeled truck body and bed 12 suitable for carrying pallets 15 with compressed gas cylinders 14 in secured manner, to prevent them for rolling around during transport.

Figure 7:
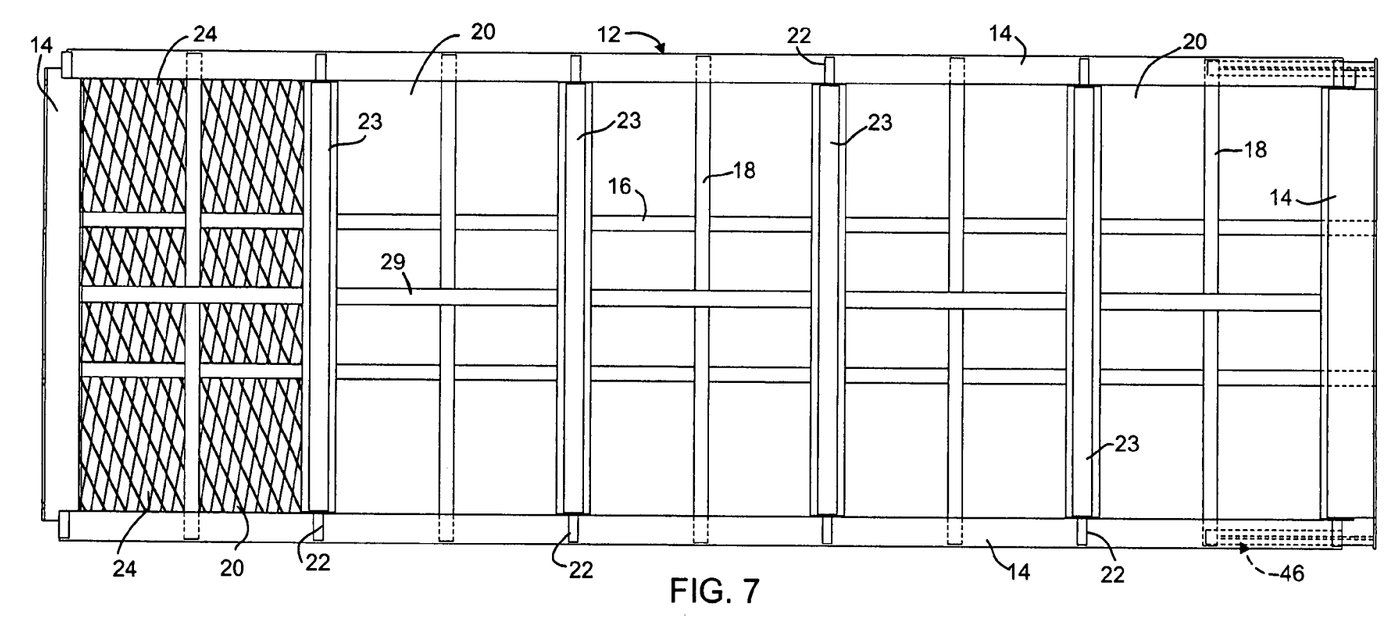
FIG. 7 is a plan view of the truck body of the previous drawings.
Figure 8:
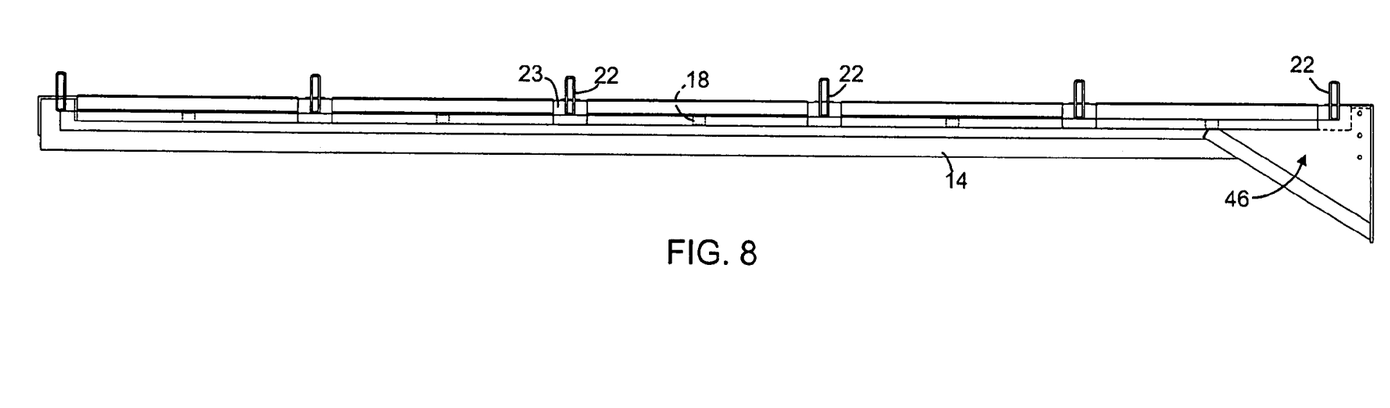
FIG. 8 is a side elevational view of the truck body of the previous drawings.

FIG. 7 shows a plan view of truck bed 12, with truck bed 12 being substantially made of an outer, rectangular frame 14 and a series of crossing, longitudinal crossbars 16 and lateral crossbars 18, to provide a grillwork bed and a series of open compartments 20, each compartment being for receiving a pallet. Added box beams 23 are present, being higher than crossbars 16, 18, with individual pallets resting on the crossbars and relatively snugly fitting between spaced box beams 23. Tubular latch members 22 (see especially FIG. 10A) each have an aperture 25 that receives a spring retention pin of a pallet 15, for pallet retention. Pallets 15 are loaded from the side of truck bed 12. Pallets 15 also engage center tube 29 to lock them to truck body 12. A pair of center tubes may be used if desired.

It can be seen that truck body 12 would not be very safe to walk on unless every pallet bay 20 carried at least an empty pallet, since workers might fall through.

Thus, by this invention, expanded metal sheets 24 may be carried in any or all of the pallet bays (compartments) 20, with some of said sheets being shown in FIG. 7. Metal sheets 24 are installed by welding to members 14, 16, 18, and 23, particularly to the undersides of members 14, 16, and/or 18. The use of such an expanded metal sheet is particularly desirable in the case where gas cylinders 14 are generally permanently carried on a pallet, for example because they have a common connection with a manifold valve. In that case, the pallet and the gas cylinders will stay together as an integral unit, and the truck 10 may return from the customer without pallets. For that circumstance, expanded metal sheets 24 can provide protection against falling for workers on the truck bed in the circumstance where a pallet 15 is not present.

Figure 2:
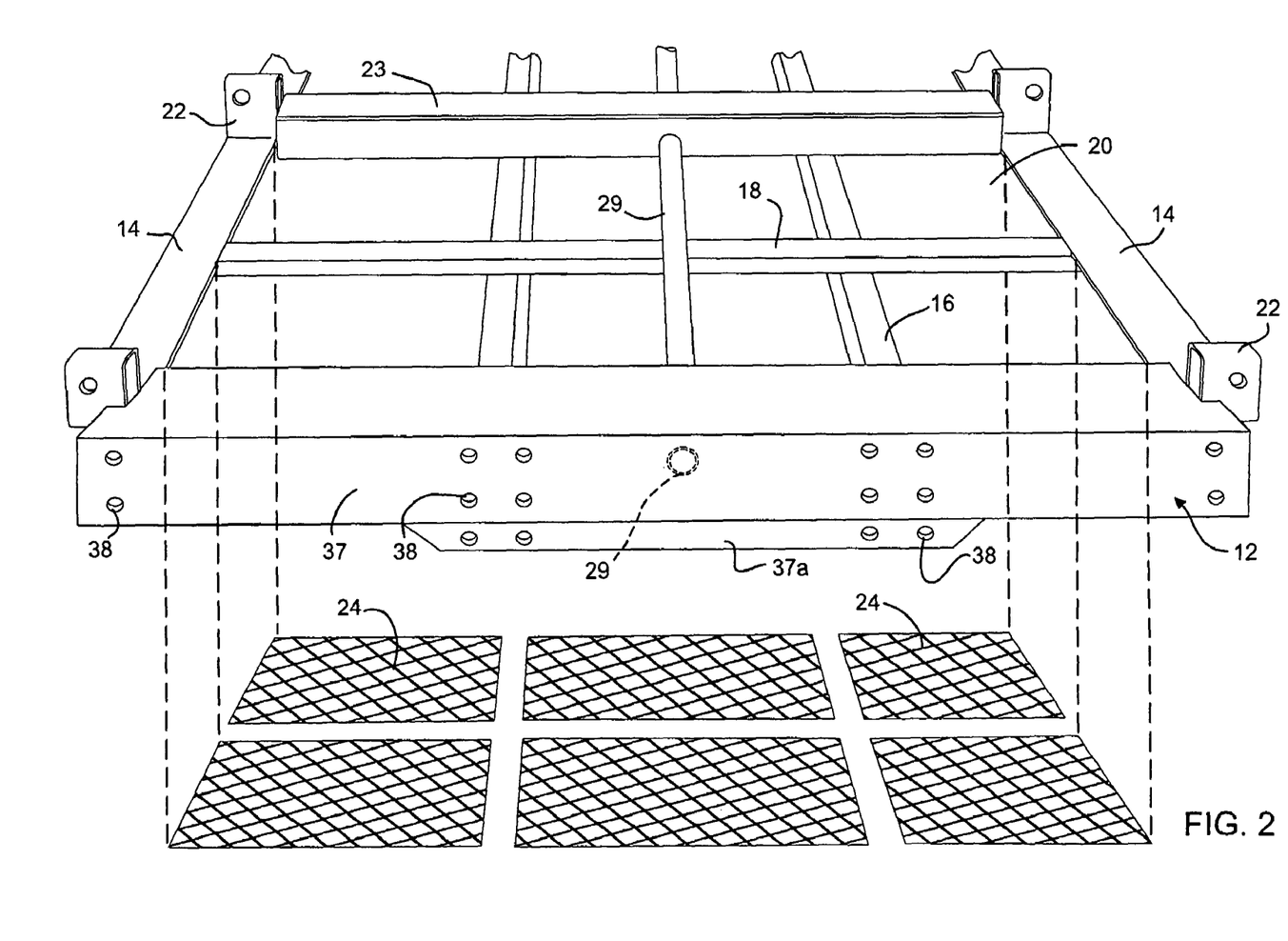
FIG. 2 is a fragmentary, perspective view of the front end of the truck body of FIG. 1.

FIG. 2 shows how such an expanded metal sheet 24 can be placed in a bay (compartment) 20, in which a pallet 15 carrying compressed gas cylinders 14 is intended to rest. Pallet 15 may carry an attached pallet fence 30 (FIG. 1), to which the compressed gas cylinders 14 may be chained or otherwise attached.

Figure 3:
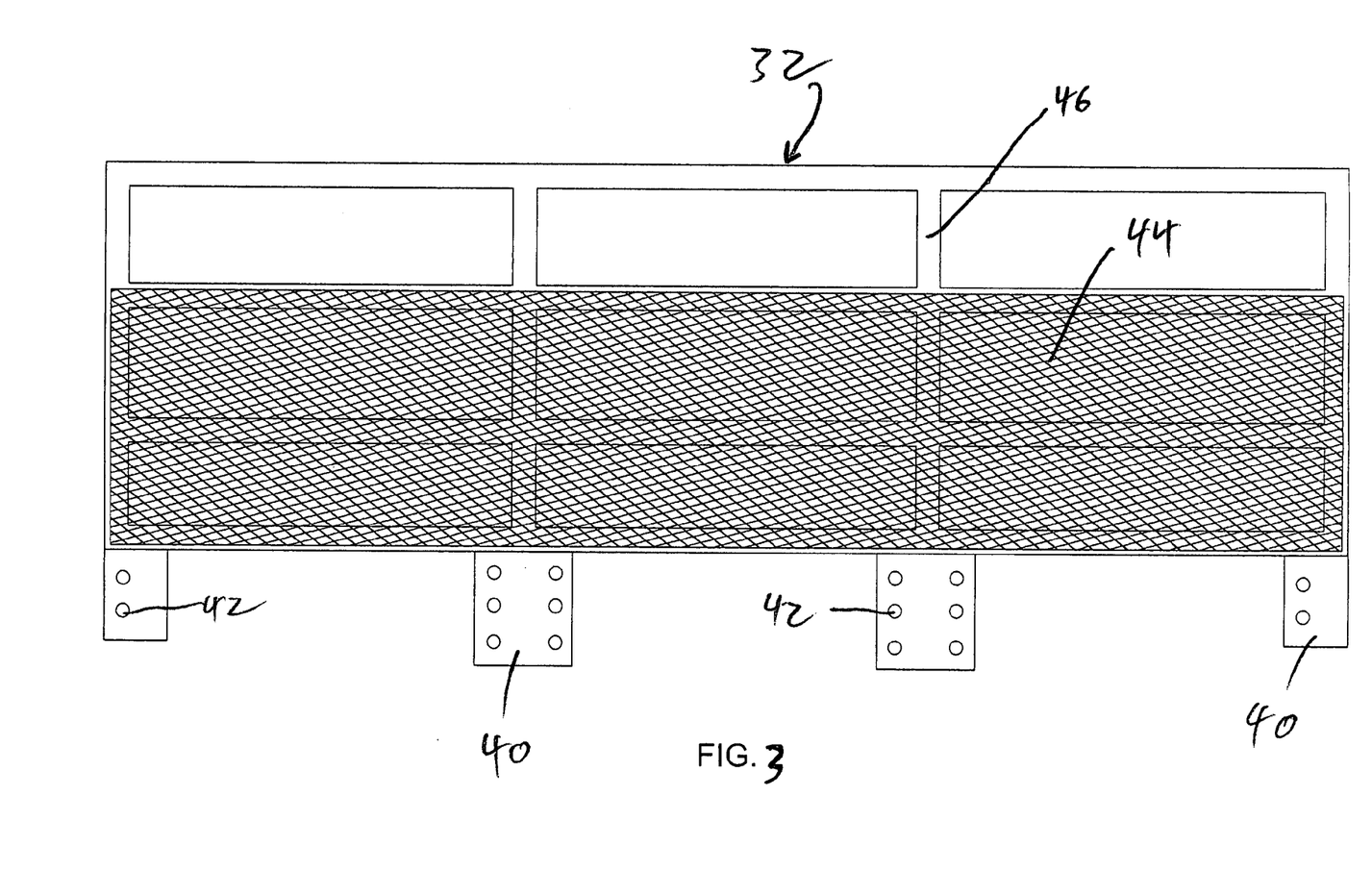
FIG. 3 is an elevational view of an attachable and detachable front fence member which may be carried on the truck body.
Figure 3A:
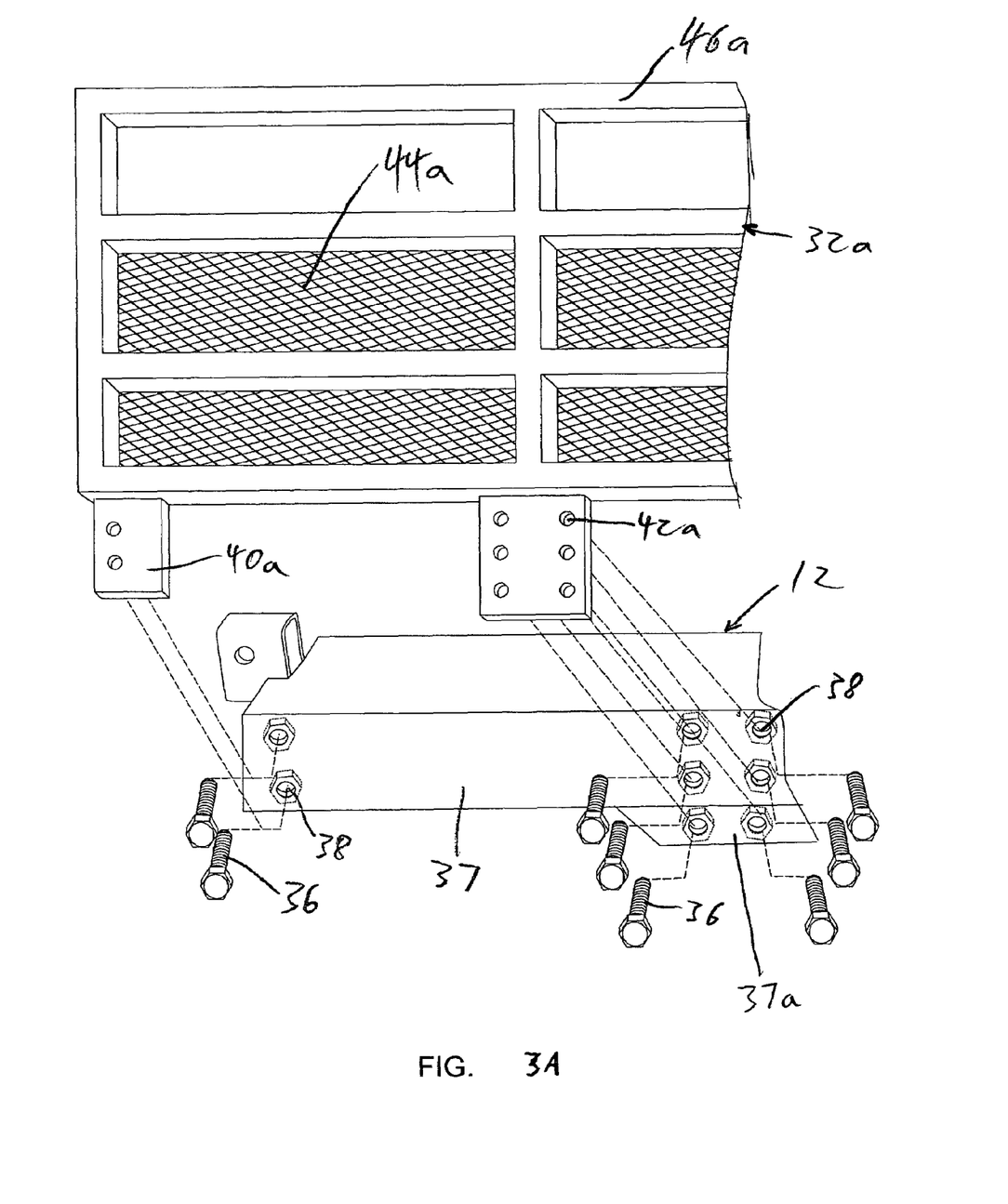
FIG. 3A is fragmentary, perspective view of a front fence and the way that it can be attached to the truck body.

Typically, truck body 12 carries a forward fence member 32, and is positioned forward of the pallets. Different customers prefer, for the particular fence member that they use, to have a specific height, and this height of the preferred fence member 32 may vary from customer to customer, and from industry to industry. In the past, the Welding Company of America (WELDCOA) has maintained an inventory of truck bodies having welded forward fences similar to fence members 32, 32a of three different heights; i.e. three different products that must be kept in inventory. By this invention, a truck body 12 is shown in FIGS. 3 and 3A to have a fence member 32 or 32a, that can be bolted or otherwise removably secured to the forward end of truck body 12, so that a single truck body product may be customized by the installation of a fence member 32 or 32a having the particular height desired by the customer after the order has been placed, without the need to maintain an inventory of truck bodies having permanently welded forward fence members of varying heights. Instead, fence member 32 may be selected from a group of fence members of varying height, and then quickly and easily attached to forward plate 37 of truck body 12 by means of bolts 36. Apertured retention tabs 40 or 40a, as shown in FIGS. 1, 3, and 3A, provide strong, bolted connection to the forward fence member 32 or 32a as desired. Fence member 32 can be seen to have tabs 40 with holes 42 that match the pattern of holes 38 in forward plate 37 (FIG. 2) and plate extension 37a, for easy attachment.

In FIG. 3A, forward fence member 32a has similar tabs 40a with apertures 42a for connection by nuts and bolts 36 in the respective apertures 38 for similar attachment of forward fence 32a to forward plate 37. Fence member 32a may be of a different height than fence 32. Also, it can be seen that expanded metal mesh 44, 44a can be carried on a fence rail arrangement 46 or 46a to cover the lower apertures, or any and all of the apertures defined by the fence rail arrangement in each of fence members 32, 32a.

Figure 4:
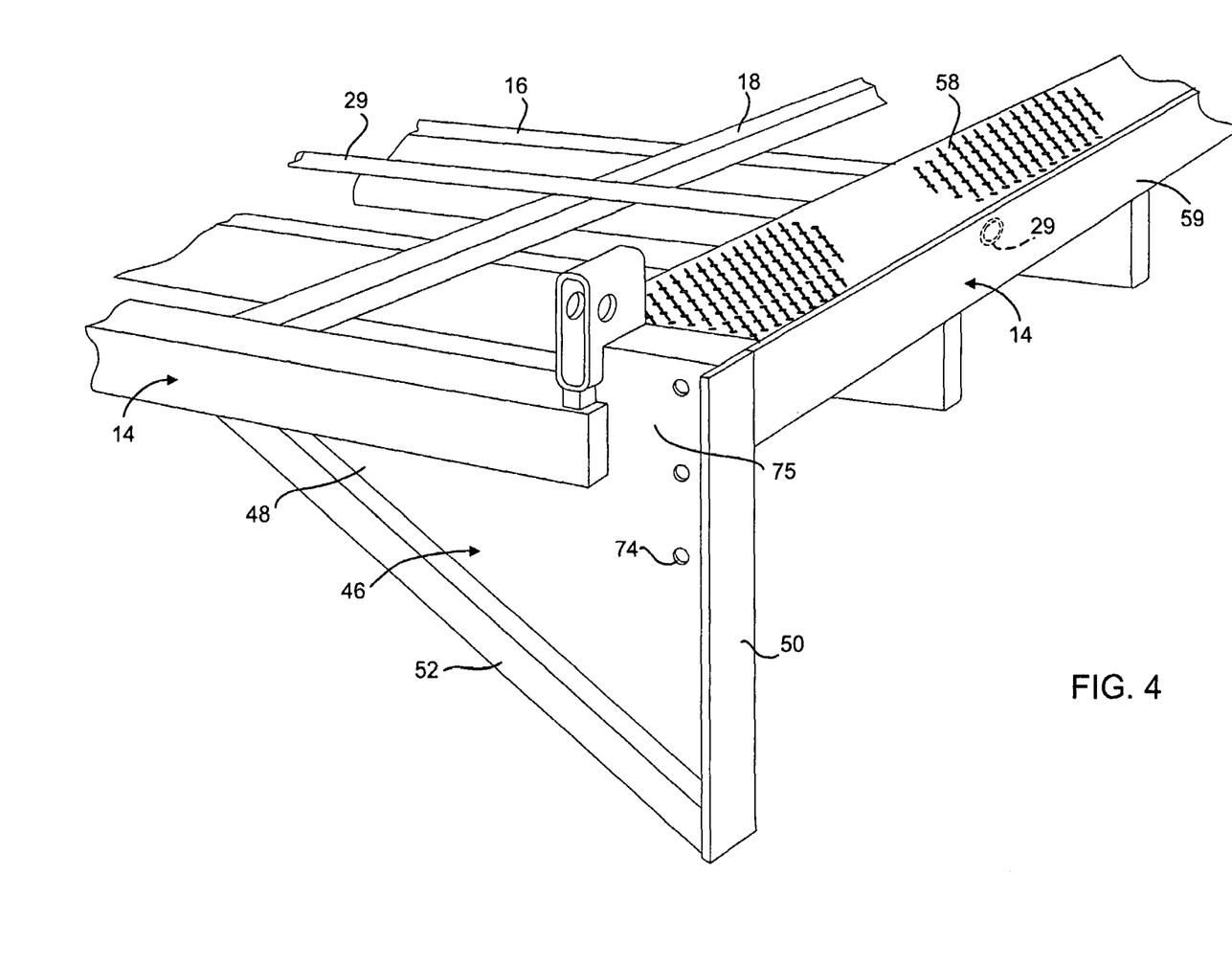
FIG. 4 is a fragmentary, perspective view of the rear end of the truck body of FIG. 1.

Turning to FIG. 4, the rear of truck body 12 is shown. One corner of the rectangular frame portion 14 is shown carrying a triangular gusset member 46 at the corner, defining a triangular plate 48, a vertical mounting plate 50, and a lower angled metal brace 52. In FIG. 4, the conventional lift gate 56 (FIG. 1) is not shown. However, that lift gate is mounted by welding on the outer face of mounting plate 50. Lift gate 56 is conventional, pivots and lowers to a horizontal position so that gas cylinders 14, typically without the pallets, may be placed upon the horizontal lift gate 56. The lift gate then lifts vertically, to be horizontally substantially flush with the top surface 58 of the rear frame bar 59 of frame for ease in transfer of the gas cylinders to and from the bed of truck body 12. The other rear corner of frame 14 may be similar to that shown in FIG. 4.

Figure 5:
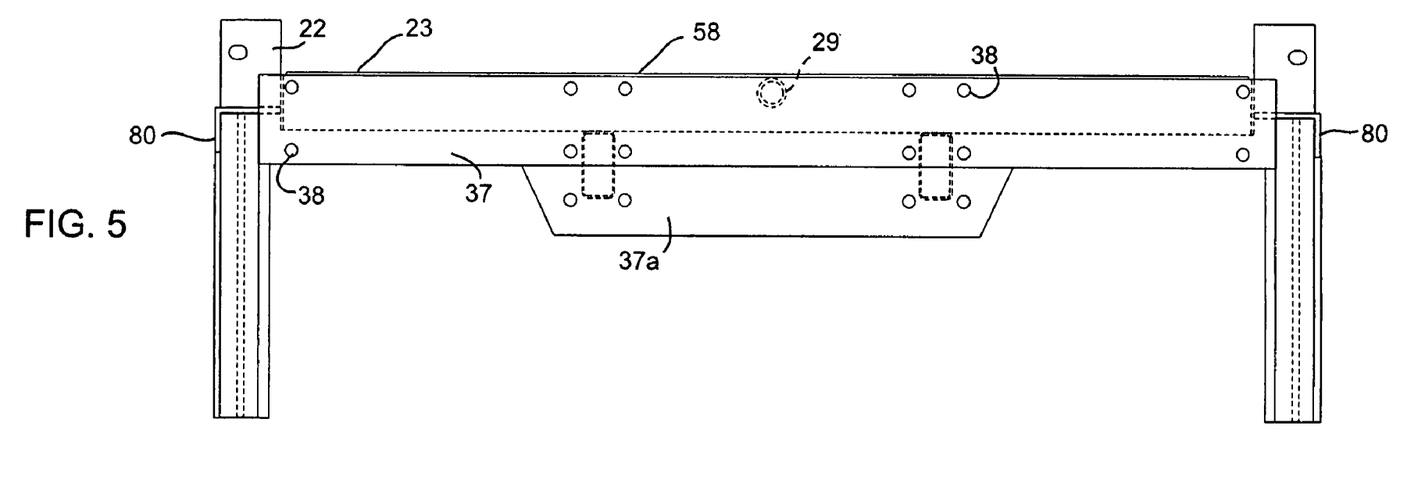
FIG. 5 is an elevational view of the front end of the truck body as shown in FIG. 2.
Figure 6:
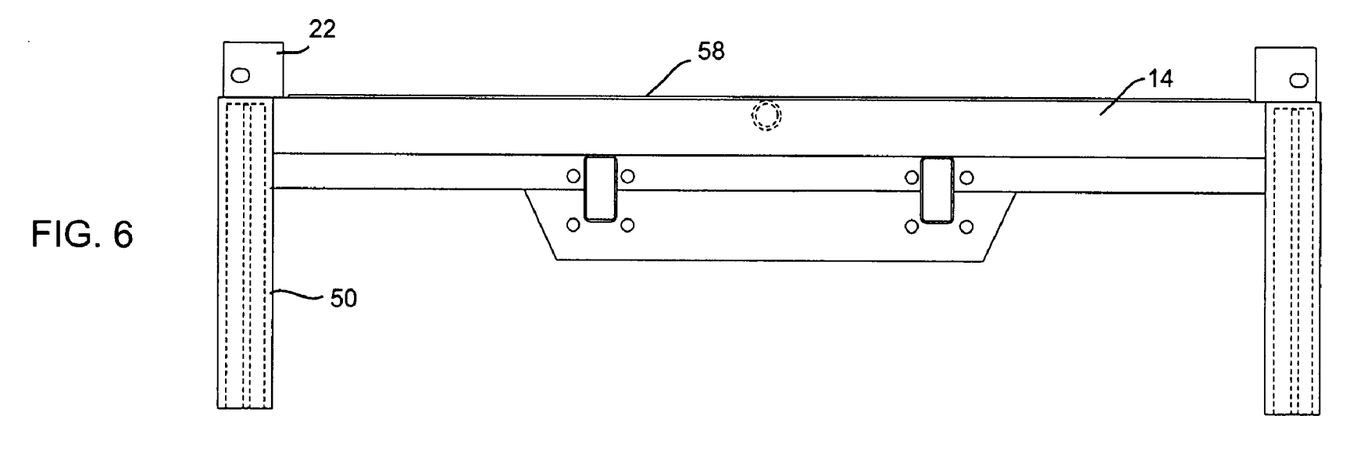
FIG. 6 is an elevational view of the rear end of the truck bed as shown in FIG. 4.

FIG. 6 is an elevational view of the rear end of truck body 12 without the attached lift gate member, while FIG. 5 is an elevational view of the front end of the truck body, without front fence member 32.

Figure 9:
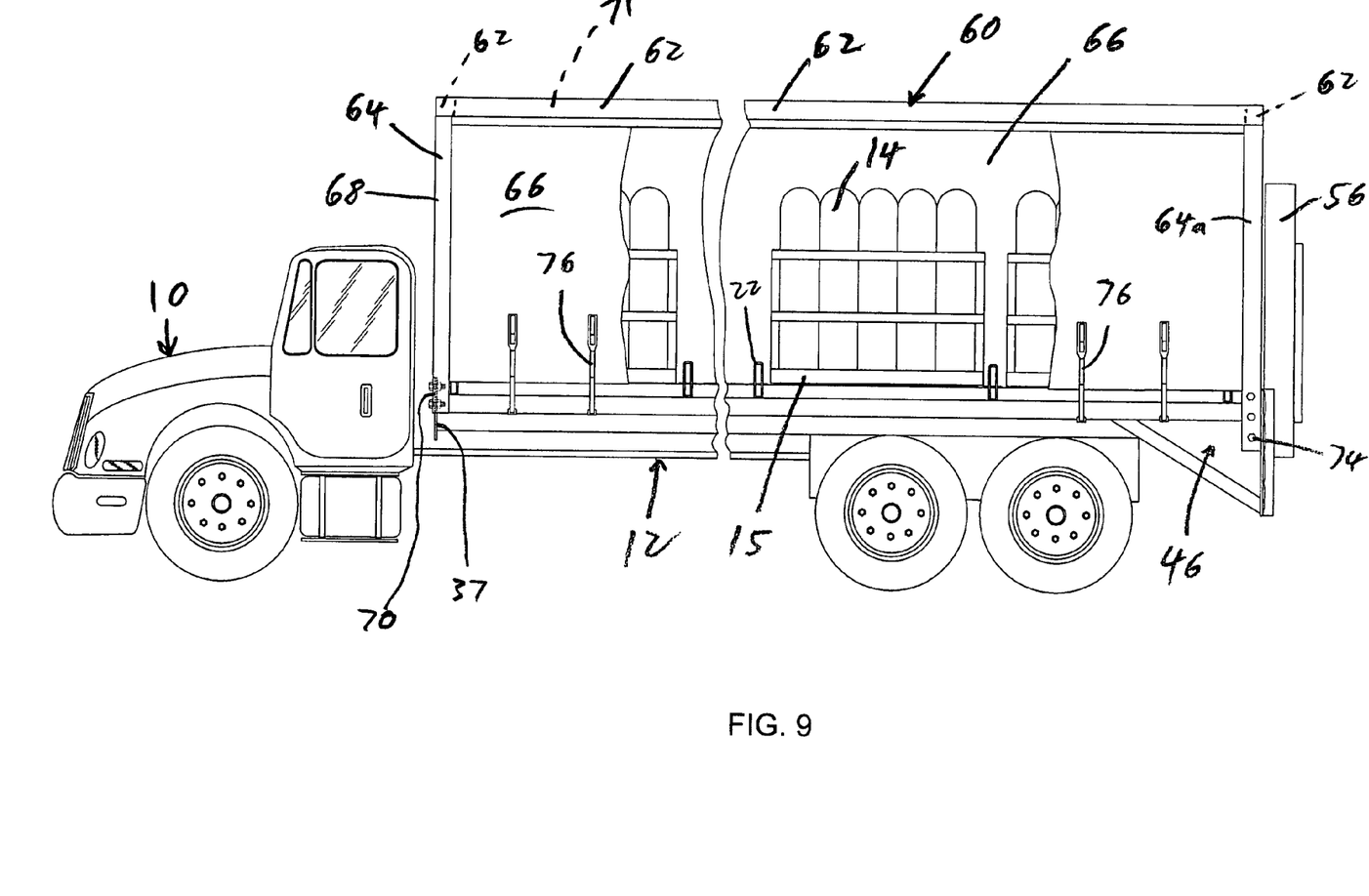
FIG. 9 is an elevational view of the truck body of the previous drawings, shown to be carrying a lightweight curtain/roof accessory, with curtain portions broken away.
Figure 10:
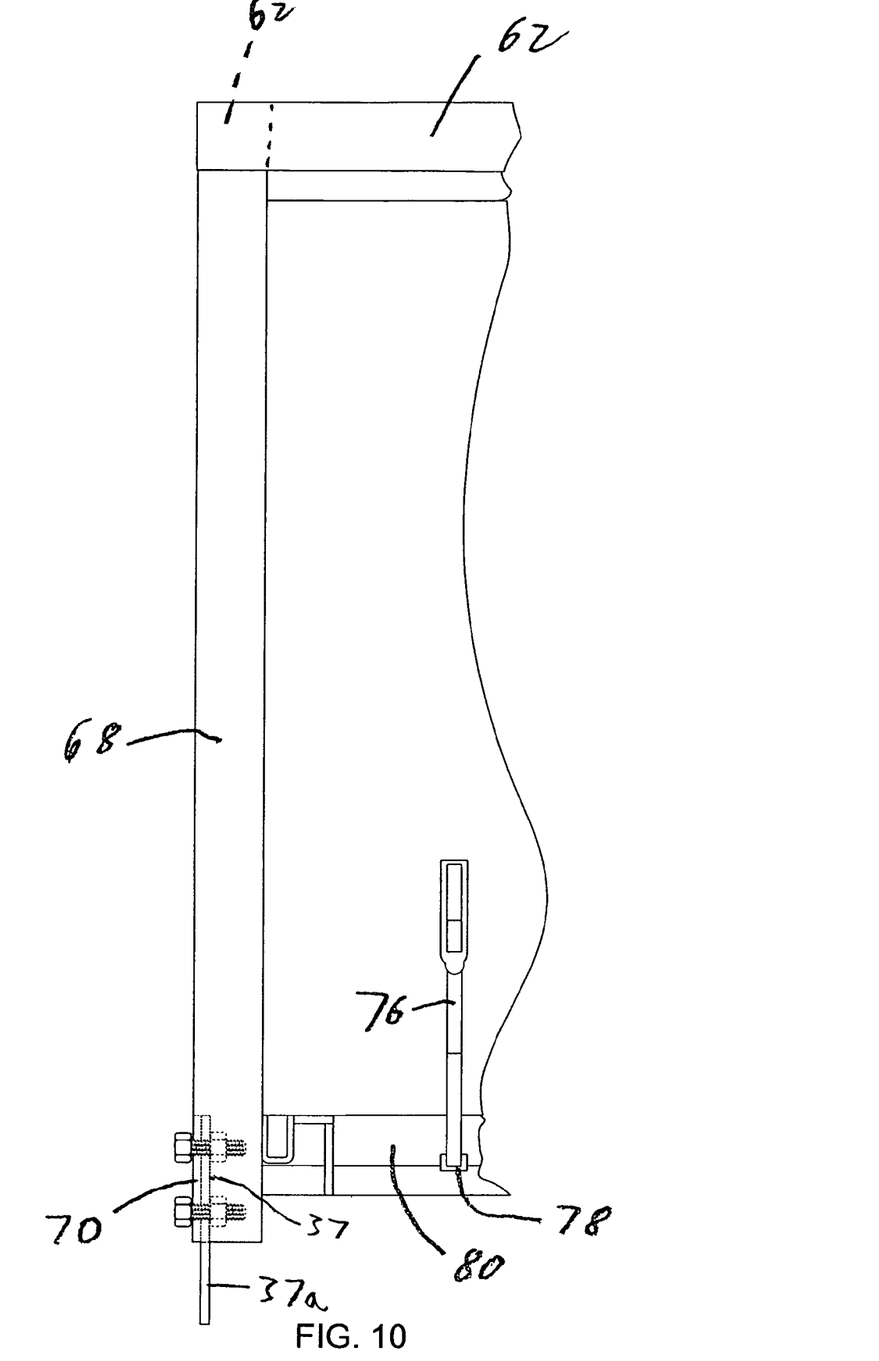
FIG. 10 is an enlarged, fragmentary side elevational view of the front of the truck body of FIG. 9 and the curtain/roof accessory.
Figure 10A:
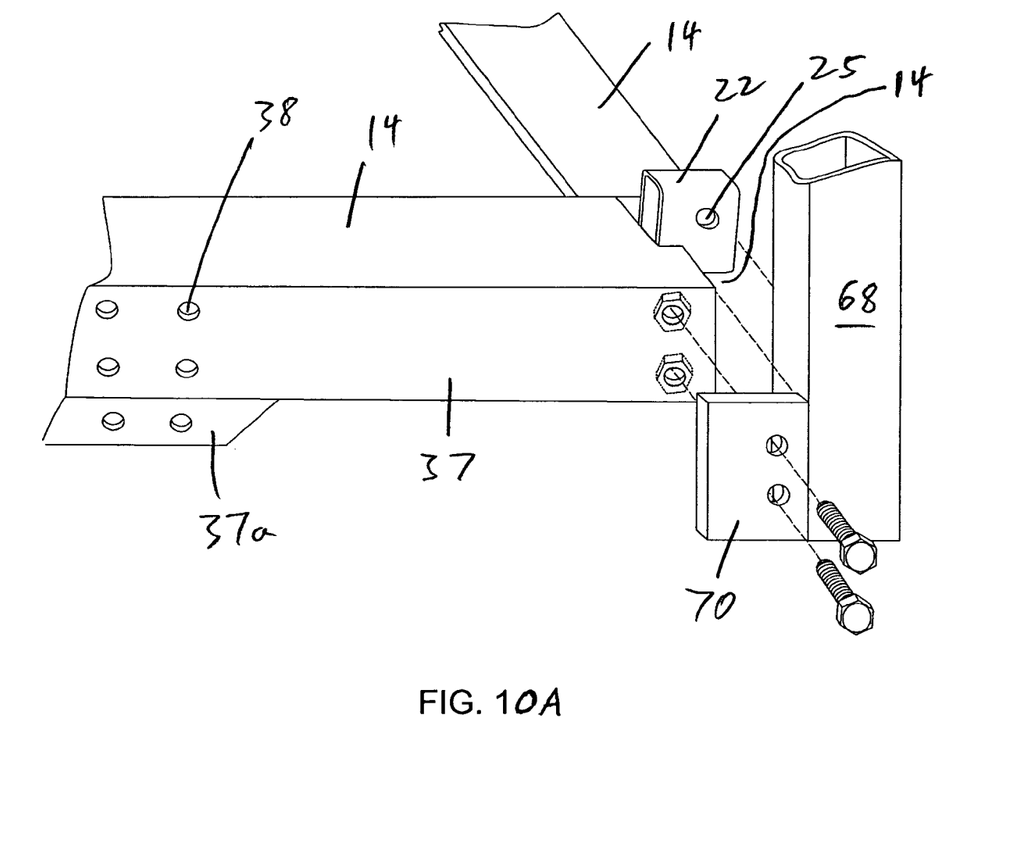
FIG. 10A is a fragmentary, perspective view of a portion of FIGS. 9 and 10.
Figure 11:
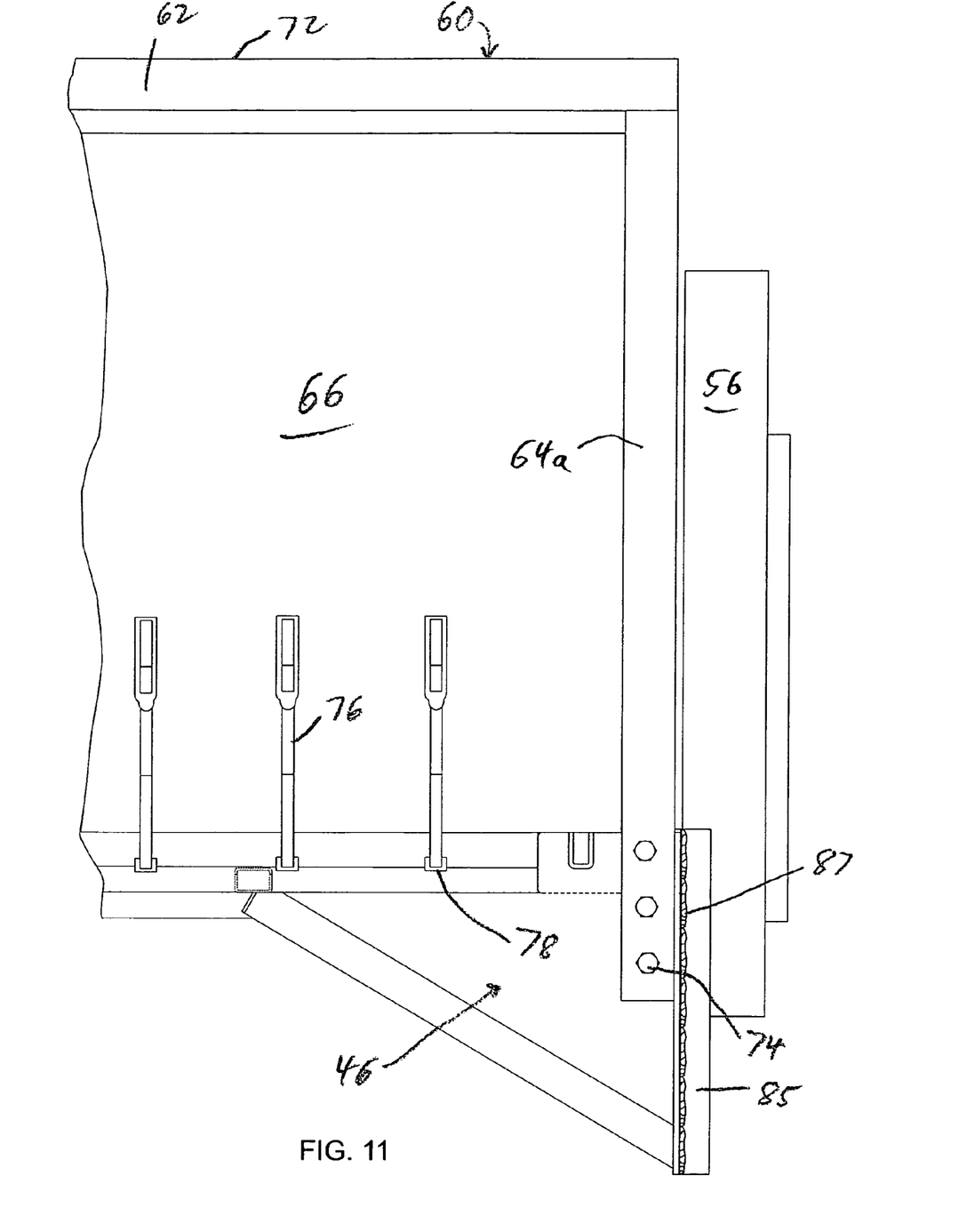
FIG. 11 is a fragmentary, side elevational view of the rear end of the truck body of FIG. 9 and the curtain/roof accessory.

Turning to FIGS. 9, 10, and 11, a curtain/roof accessory assembly 60 is shown mounted on the truck body and bed 12 of FIG. 1. The curtain/roof accessory 60 comprises a lightweight rectangular frame comprising a rectangle of horizontal struts 62 and four vertical struts 64, 64a at the rectangle corners. Flexible, curtain-like side walls 66 are provided on each side of the truck, plus a forward wall 68 between the forward vertical struts 64. In this embodiment, when curtain/roof structure 60 is in use, the forward fence 32, 32a is not used. As can be seen in FIGS. 9, 10 and 10a, forward, vertical struts 68 may carry an attached projecting plate 70, which can attach with bolts to forward plate 37 of truck bed 12. A roof portion 71 of curtain/roof assembly 60 may also be made of flexible material, attached between horizontal, rectangular strut members 62.

At the rear of truck body and bed 12, the rear, vertical struts 64a fit into recess 75 (FIG. 4) and are attached by bolts to gusset plate 46 through holes 74, as particularly shown in FIGS. 4 and 9.

Curtain walls 66 can slide horizontally, to open side portions of the enclosure defined within curtain/roof assembly 60, to permit pallet loading and unloading. Also, strap members 76 are provided to hold each curtain 66 in position, the strap member 76 being equipped with bottom hooks 78 (FIGS. 10 and 11) to attach to the side angle iron flange 80 (FIG. 5) that runs along the length of each side of truck body and bed 12.

Figures 12, 13:
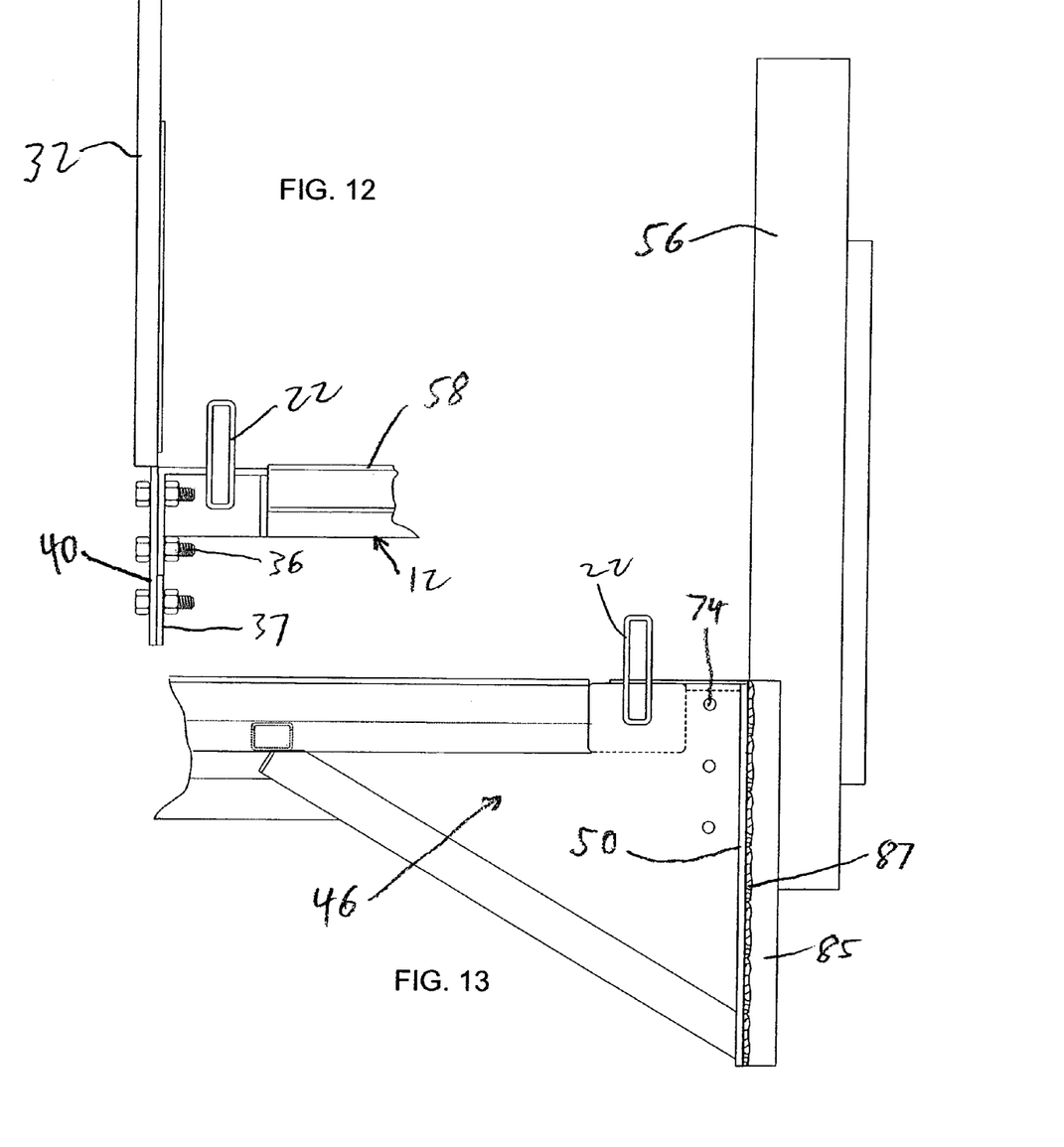
FIG. 12 is a fragmentary, side elevational view of the truck body front end of FIG. 2, showing how a fence of desired size may be bolted in place at the front end.
FIG. 13 is a fragmentary, side elevational view of the rear end of the truck body of FIG. 4, showing the attachment of the lift gate mount.

FIG. 12 provides enlarged details of the connection of front fence 32 to truck body 12.

FIG. 13 provides added details of the attachment of lift gate mount 56 to plate 50, showing lift gate mounting plate 85 being welded along area 87 to mounting plate 50.

The above has been offered for illustrative purposes only, and is not intended to limit the scope of the invention of this application, which is as defined in the claims below.

The invention claimed is:

1. A vehicle for transport and delivery of gas cylinders, which comprises:
   a truck having a driver cab, a truck body, and a bed for carrying the gas cylinders connected to the driver cab and body, said bed comprising a series of horizontal, crossing, longitudinal and lateral crossbars to provide a series of open compartments, said compartments being proportioned to receive a pallet carrying compressed gas cylinders, said compartments carrying horizontal, secured, apertured metal sheeting across their areas for safety when a pallet is not present.

2. The vehicle of claim 1 in which said apertured metal sheeting is carried underneath at least of some of said crossbars.

3. The vehicle of claim 2 in which said apertured metal sheeting is welded to ones of said longitudinal and lateral crossbars.

4. The vehicle of claim 2 in which said apertured metal sheeting is expanded metal sheeting.

5. The vehicle of claim 1 in which said apertured metal sheeting is expanded metal sheeting.

6. The vehicle of claim 1 in which said truck has a fence member, positioned adjacent to a forward end of the bed and behind the driver cab, said fence member being removably secured in place to permit customized installation of a said fence member of a desired height.

7. The vehicle of claim 1 in which said truck body defines a frame that carries said bed, said frame defining a rear portion that carries a pair of triangular gusset members adjacent to rear corners of the frame, said gusset members each carrying vertical rearwardly facing mounting plates, and a lift gate, welded to outer faces of said mounting plates.

8. The vehicle of claim 1 in which said truck body carries a curtain assembly which comprises a rectangular frame which, in turn, carries flexible, curtain-like side walls; and strap members attached to said curtain-like side walls, said strap members having lower ends that carry bottom hooks, said bottom hooks engaging portions of said truck body to secure said side walls.

* * * * *